Patented Oct. 16, 1945

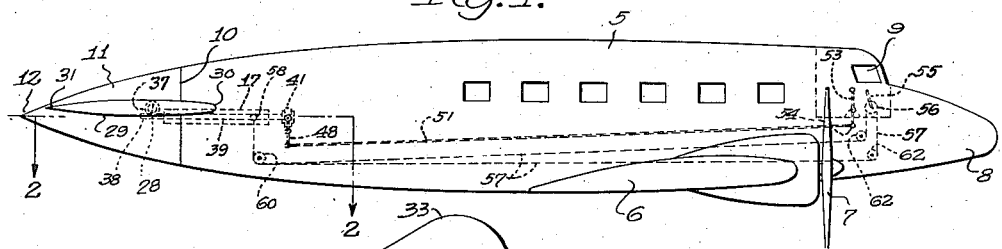

2,386,915

UNITED STATES PATENT OFFICE 2,386,915

AIRCRAFT

George Spittler, Wyandotte, Mich.

Application May 25, 1942, Serial No. 444,295

1 Claim. (Cl. 244—88)

The present invention relates to improvements in aircraft and more particularly to steering means therefor.

The primary object of the invention is to provide a steering gear for aircraft which will eliminate the rear rudder and allow easy and adequate control of the plane with a minimum number of manual control elements, capable of being coordinated into a single unit.

A further object of the invention is to provide an aircraft steering gear which will accomplish all of the steering purposes desired in a more efficient manner and with less effort on the part of the pilot.

A further object of the invention is to provide a steering control for aircraft which will require comparatively few parts and which will eliminate the hazard of accidents to a large degree by reason of the few parts to become out of order and damaged.

A further object of the invention is to provide an aircraft control of the above mentioned character which will increase the maneuverability of the plane without the use of additional controls or steering equipment.

Other objects and advantages of the invention will become apparent during the course of the following description of the accompanying drawing, wherein:

Figure 1 is a side elevational view of a plane illustrating an embodiment of the invention as applied thereto;

Fig. 2 is a longitudinal cross sectional view of the steering gear taken on line 2—2 of Fig. 1, looking in the direction of the arrows illustrating the details of construction and the manner of control;

Fig. 3 is a longitudinal cross sectional view taken on line 3—3 of Fig. 2, looking in the direction of the arrows further showing details of construction and the manner in which the steering gear is controlled;

Fig. 4 is a transverse cross sectional view taken on line 4—4 of Fig. 3 looking in the direction of the arrows showing the control element for rocking the elevators to acquire a rudder action; and Fig. 5 is a vertical cross sectional view taken on line 5—5 of Fig. 3 looking in the direction of the arrows illustrating the steering control for the elevator action.

In the drawing, wherein for the purpose of illustrating the invention, and wherein like reference characters will be employed to designate like parts throughout the same, the reference character 5 will generally be employed to designate an aircraft fuselage having sustention and propulsion means 6 and 7 respectively adjacent the forward end thereof. The fuselage generally includes a nose portion 8 and a pilot's cab 9 rearwardly thereof as shown best in Fig. 1.

The rear portion of the fuselage terminates as at 10 and a rotatable tail portion 11 is secured thereto in a manner which will be hereinafter more fully described. The tail portion 11 tapers rearwardly and converges into a tail tip 12.

Mounted adjacent the end of the fuselage and close to the terminating point 10 is a pair of cruciform bearing brackets 13 and 14 having bearing bosses 15 and 16 respectively for rotatably supporting a tubular shaft 17. The criciform brackets 13 and 14 may be fastened to the inner wall of the fuselage by welding or the like so as to produce a relatively rigid supporting structure for the tubular shaft 17. One end of the tubular shaft 17 is enlarged as at 18 and is provided with an annular flange 19 abutting the bearing boss 16 thereby preventing longitudinal movement of the tubular shaft rearwardly of the fuselage. The opposite end of the tubular shaft 17 projects beyond the rear termination 10 as at 20 and is fitted with a collar 21 held in place by means of an anchoring pin 22 or other fastening device. The collar 21 is formed at the intersection of the arms of the cruciform bracket 23 the outer ends of which are fastened to the inner wall of the tail piece 11 by being welded or otherwise secured thereto, adjacent the forward open end of the tail piece as at 24.

Formed on diametrically opposed portions of the tail piece 11 adjacent the open end thereof is a pair of bearing members 26 having annular flanges 27 obliquely set with respect to the bearing members 26 so as to position the bearings in direct alignment. Extending through the bearing members 26 and rotatable therein is a shaft 28 the free ends of which project through the bearing members and are provided with elevators 29 having angularly disposed leading edges 30 and aligned trailing edges 31. The leading and trailing edges are connected at their outer ends by a curved edge 33 and the elevators 29 are secured in position on the shaft 28 by said shaft being received in suitable openings in the inner edges 34 of the elevators 29 as at 35. Fastening pins or rivets 36 may be provided for securing the elevators in place and for rigidly connecting the same with the rotary shaft 28.

Intermediate the ends of the rotary shaft, there is provided a gear pinion 37 keyed or otherwise secured thereto against rotational movement, and said pinion is in direct alignment with the tubular shaft 17 to be engaged by a rack bar 38 formed on the end of a reciprocating bar or rod 39 slidably received in the tubular shaft 17. The forward end of the slidable bar 39 projects beyond the end of the tubular shaft 17 and is provided with a pair of spaced annular flanges 40 for rotatably receiving a collar 41 having diametrically disposed pins 42 as clearly shown in Fig. 5.

Extending forwardly from one of the arms of the cruciform bracket 14 is a bracket arm 44 the free end of which is provided with a bifurcated end 45 having aligned openings 46 for receiving a pivot pin 47. Mounted between the bifurcations 45 is a rock lever 48 pivoted on the pin 47 and said rock lever is provided with a yoke 49 having apertured ends for receiving the collar pivot pins 42. The opposite end of the rock lever 48 is bifurcated as at 50 for receiving one end of a control rod 51 adapted to be held in place by a pivot pin 52. The forward or opposite end of the control rod 51 is connected to a manual operating lever 53 as at 54 adjacent the pilot cab and within easy reach of the pilot. It will thus be seen that operation of the manual control lever 53 to and fro will reciprocate the slide rod 39 and cause the elevators 29 to be tilted in both directions to the horizontal.

The rudder action is produced by a control lever 55 suitably mounted in the pilot's cab and said lever 55 is attached to a pulley 56 over which is trained a cable 57, the ends of which are connected to oppositely disposed arms 58 formed on the forwardly projecting portion 18 of the tubular rotary shaft 17. Suitable ball and socket connections 59 are provided for attaching the free ends of the cable to the arms 58 to reduce friction as much as possible and guide pulleys 60 are supported by pulley brackets 61 on the runway of the fuselage to guide the cable during its movement. Likewise, guide pulleys 62 may be mounted adjacent the pilot cabin to guide the cable 57 end to reduce friction to a very small degree.

It will readily be seen, that rotation of the tail piece 11 when the elevators 29 are tilted slightly will produce a rudder action and will thus steer the aircraft, thereby eliminating the necessity for an independent rudder extending vertically from the fuselage tail.

In operation, the manual controls 53 and 55 may be manipulated to produce the desired elevation or rudder action as desired and the maneuverability of the aircraft will be increased so that "rolls" and other maneuvers may be carried out.

It is to be understood that the form of the invention shown and described is to be taken as a preferred embodiment of the invention and that various changes in the shape, size and arrangement of parts may be resorted to without departing from the spirit of the invention or the scope of the subjoined claim.

What I claim is:

In combination with an aircraft fuselage tapered rearwardly and terminating in a frusto-conical end portion, a conical tail piece for said aircraft for positioning on the frusto-conical end portion so that the taper of the fuselage is continuous with the taper of the tail piece, a tubular shaft secured to said tail piece and projecting into said fuselage, bearing means in said fuselage for rotatably supporting said tubular shaft, a shaft extending through said tail piece transversely of said tubular shaft and offset from the axis thereof, a third shaft extending through the tubular shaft mounted for longitudinal sliding and rotary movement therein, a pinion gear mounted on said transverse shaft intermediate its ends, a pinion engaging rack portion on one end of said third shaft drivingly engaging said pinion for causing rotation of said transverse shaft in both directions upon reciprocal longitudinal movement of said rotatable and slidably mounted shaft, air foils mounted on each end of said transversely extending shaft exteriorly of said tail piece to rotate with said transverse shaft, control means for rotating the tubular shaft whereby the tail piece will be rotated about its longitudinal axis, and control means for reciprocating said rotatable and slidably mounted shaft longitudinally to rotate said transversely extending shaft about its longitudinal axis and adjust said air foils, said air foils being formed with plane surfaces extending on both sides of the axis of said transversely extending shaft with the forward portion of each air foil projecting in symmetry with the frusto-conical end portion of said fuselage and overlapping the joint between the fuselage and tail piece.

GEORGE SPITTLER.